(12) United States Patent
Zahedi et al.

(10) Patent No.: US 12,459,389 B2
(45) Date of Patent: Nov. 4, 2025

(54) ONBOARD MEDIUM-VOLTAGE VESSEL ELECTRIC CHARGING APPARATUS AND METHOD FOR ONBOARD CHARGING

(71) Applicant: Kongsberg Maritime AS, Horten (NO)

(72) Inventors: Bijan Zahedi, Kongsberg (NO); Jens Hjorteset, Björöyhamn (NO); Joao Pedro Meira Rego, Kongsberg (NO)

(73) Assignee: Kongsberg Maritime AS, Horten (NO)

( * ) Notice: Subject to any disclaimer, the term of this patent is extended or adjusted under 35 U.S.C. 154(b) by 86 days.

(21) Appl. No.: 18/699,926

(22) PCT Filed: Oct. 7, 2022

(86) PCT No.: PCT/NO2022/050226
§ 371 (c)(1),
(2) Date: Apr. 10, 2024

(87) PCT Pub. No.: WO2023/063830
PCT Pub. Date: Apr. 20, 2023

(65) Prior Publication Data
US 2024/0408991 A1    Dec. 12, 2024

(30) Foreign Application Priority Data

Oct. 11, 2021   (NO) .................................. 20211217

(51) Int. Cl.
*B60L 53/62*   (2019.01)
*B60L 53/22*   (2019.01)
*H02J 3/16*    (2006.01)

(52) U.S. Cl.
CPC .............. *B60L 53/62* (2019.02); *B60L 53/22* (2019.02); *H02J 3/16* (2013.01); *B60L 2200/32* (2013.01); *B60L 2210/30* (2013.01); *H02J 2310/42* (2020.01)

(58) Field of Classification Search
None
See application file for complete search history.

(56) References Cited

U.S. PATENT DOCUMENTS

| 6,331,765 | B1 | 12/2001 | Yamamoto et al. | |
|---|---|---|---|---|
| 7,919,881 | B2 | 4/2011 | Hartig et al. | |
| 9,054,555 | B1 | 6/2015 | Ward | |
| 9,487,284 | B2 | 11/2016 | Crane et al. | |
| 9,809,124 | B2 * | 11/2017 | Czainski | B60L 53/12 |
| 2011/0140522 | A1 * | 6/2011 | Van Riet | B64F 1/36 |
| | | | | 307/42 |
| 2011/0298283 | A1 * | 12/2011 | Sannino | H02J 3/34 |
| | | | | 307/38 |
| 2013/0016541 | A1 | 1/2013 | Norrga et al. | |

(Continued)

FOREIGN PATENT DOCUMENTS

| CN | 111725829 A | 9/2020 |
|---|---|---|
| WO | 2019071359 A1 | 4/2019 |

OTHER PUBLICATIONS

International Search Report and Written Opinion mailed Jan. 11, 2023 for International Patent Application No. PCT/NO2022/050226.

*Primary Examiner* — Daniel L Greene
(74) *Attorney, Agent, or Firm* — Alix, Yale & Ristas, LLP (57) ABSTRACT

Onboard medium-voltage vessel electric charging apparatus and method for onboard medium-voltage charging enabling compensating for voltage variations of at least one energy storage device during charging thereof.

20 Claims, 4 Drawing Sheets

(56) References Cited

U.S. PATENT DOCUMENTS

| | | | |
|---|---|---|---|
| 2013/0134935 A1 | 5/2013 | Maitra et al. | |
| 2013/0307444 A1* | 11/2013 | Settemsdal | B60L 7/14 |
| | | | 318/139 |
| 2014/0132203 A1* | 5/2014 | Schillinger | B60L 53/24 |
| | | | 320/137 |
| 2017/0373540 A1* | 12/2017 | Guidi | H02M 3/33507 |
| 2019/0036336 A1* | 1/2019 | Kuznetsov | H02K 7/025 |
| 2019/0389552 A1 | 12/2019 | Rembach | |
| 2020/0189404 A1 | 6/2020 | Haugan et al. | |
| 2021/0304958 A1* | 9/2021 | Yu | B60L 53/11 |
| 2023/0268733 A1* | 8/2023 | Reimann | H02J 1/10 |
| | | | 307/18 |

\* cited by examiner

ONBOARD MEDIUM-VOLTAGE VESSEL ELECTRIC CHARGING APPARATUS AND METHOD FOR ONBOARD CHARGING

BACKGROUND

The disclosed embodiments are related to an onboard medium-voltage vessel electric charging apparatus, as well as to a method for onboard medium-voltage charging of at least one energy storage device onboard a marine vessel.

At present, there is great interest within the marine industry to develop environmentally friendly propulsion systems for marine vessels, where the main goal is to achieve zero emissions or close to zero emissions from the marine vessel. Electric and hybrid electric (electric and fuel) propulsion systems are increasingly being used. Such systems enable the marine vessel to be driven entirely or in part by electrical energy stored in energy storage devices.

Many of modern marine vessels, e.g. ferries, have a DC (direct current) distribution system connected with the energy storage devices.

To utilize the energy from the energy storage device, a DC power consumer must be connected to the energy storage device usually via a marine vessel DC consumer network.

In order to charge the energy storage device, the marine vessel requires a power conversion stage, converting from an AC (alternating current) grid supply to DC voltage.

As dedicated standard for MVAC (medium-voltage alternating current) charging stations for marine vessels do not exist, an onboard charging system is currently preferable to enable marine vessels to connect to the standard MVAC networks meeting the requirements by the existing shore connection standards.

There is further a need within the field to reduce the footprint of required electrical equipment on the marine vessel. It is also a need to remove the requirement for large, heavy and expensive converters, especially at the marine vessel side of the charging system, as well as reducing the costs of implementing them on a marine vessel.

Further, the mentioned converters also result in power losses and there is a desire to reduce the power losses in the charging circuit as much as possible.

One way to achieve this is by making use of series compensation in the power supply to the marine vessel. Examples of such systems may be found in US2020189404 AA, U.S. Pat. No. 6,331,765 BA and US2013016541 AA. The solution of US2013016541A1 uses series connection for DC current decoupling between HVDC (high-voltage direct current) systems and AC grids. In U.S. Pat. No. 6,331,765B1 is disclosed a series compensation technique for reactive power compensation. From US2020189404A1 is known a terrestrial charging station limiting the vessel charging to certain ports with their specific configuration and controllers. However, these solutions do not solve all the mentioned needs.

It is accordingly, a need for an onboard medium-voltage vessel electric charging apparatus and method for onboard medium-voltage charging meeting all the mentioned needs.

SUMMARY

Provided herein are embodiments of an onboard medium-voltage vessel electric charging apparatus and method for onboard medium-voltage charging, partly or entirely solving the mentioned drawbacks of prior art, and/or partly or entirely meeting the mentioned needs.

The onboard medium-voltage vessel electric charging apparatus and method for onboard medium-voltage charging provides a reduction in the footprint of electrical equipment on a marine vessel.

The onboard medium-voltage vessel electric charging apparatus and method for onboard medium-voltage charging also provides for limiting the volume of electrical equipment required on the marine vessel.

Also provided is an onboard medium-voltage charging apparatus and method for onboard medium-voltage charging enabling the marine vessel to connect to a standard MVAC grid.

Also provided is an onboard medium-voltage vessel electric charging apparatus and method for onboard medium-voltage charging enabling the marine vessel to independently regulate the charging power based on the available power from the grid.

Also provided is an onboard medium-voltage vessel electric charging apparatus and method for onboard medium-voltage charging capable of rectification of the AC power supply and delivery of controlled DC current for charging of an onboard energy storage device.

Also provided herein is an onboard medium-voltage vessel electric charging apparatus and method for onboard medium-voltage charging using as few active components as possible.

Also provided is an onboard medium-voltage vessel electric charging apparatus and method for onboard medium-voltage charging capable of voltage adjustment over a wide range.

Also provided is an onboard medium-voltage vessel electric charging apparatus and method for onboard medium-voltage charging resulting in minimum converter derating.

Also provided is an onboard medium-voltage vessel electric charging apparatus and method for onboard medium-voltage charging compensating for voltage variations by adding a series voltage phasor amplitude and phase angle.

Also provided is an onboard medium-voltage vessel electric charging apparatus and method for onboard medium-voltage charging providing self-regulated charging current limiting during charging of an onboard energy storage device.

Also provided is an onboard medium-voltage vessel electric charging apparatus and method for onboard medium-voltage charging requiring less investment and installation costs, as well as maintenance costs, compared to prior art solutions.

An onboard medium-voltage vessel electric charging apparatus according to the disclosure is configured for connection to an AC (alternating current) power supply at one side and to at least one onboard energy storage device at the other side, either directly or via a vessel DC (direct current) consumer network.

The onboard medium-voltage vessel electric charging apparatus comprises a rectifier unit comprising a rectifier transformer and at least one rectifier bridge arranged in series between the AC power supply and the at least one energy storage device or vessel DC consumer network.

The onboard medium-voltage vessel electric charging apparatus further comprises a controllable compensation unit arranged in series between the rectifier unit, vessel DC consumer network or at least one energy storage device and the AC power supply, in front of the rectifier transformer. The controllable compensation unit is configured to compensate for voltage variations of the vessel DC consumer network or at least one energy storage device by adding a series voltage phasor with different amplitude and phase angle to supplied AC voltage to adjust rectifier voltage of the rectifier unit.

The mentioned rectifier unit and controllable compensation unit thus forms a charging circuit for charging of the at least one onboard energy storage device.

According to one embodiment, the rectifier transformer is a Medium-Voltage to Low-Voltage AC transformer.

In accordance with another embodiment, the controllable compensation unit comprises a compensation transformer arranged in series between the AC power supply and rectifier transformer of the rectifier unit. The controllable compensation unit further comprises at least one controllable compensation converter arranged in series between the at least one rectifier bridge of the rectifier unit, vessel DC consumer network or at least one energy storage device and the compensation transformer.

In accordance with one embodiment of the onboard medium-voltage vessel electric charging apparatus, the controllable compensation converter is a Low-Voltage converter.

According to one embodiment of the onboard medium-voltage vessel electric charging apparatus, the at least one compensation unit is configured to provide the series voltage phasor amplitude as a symmetric or asymmetric range of required DC-voltage to the vessel DC consumer network or at least one energy storage device.

In accordance with one embodiment of the onboard medium-voltage vessel electric charging apparatus, the symmetric range of the series voltage phasor amplitude is between −15% to 15%, more preferably between −10% to 10% of the required DC-voltage. The example ranges are not to be considered as limiting the invention disclosed and claimed herein, as these are only examples and other ranges will be within the knowledge of a skilled person.

According to one embodiment of the onboard medium-voltage vessel electric charging apparatus, the asymmetric range of the series voltage phasor amplitude is between −30 to 0%, more preferably between −20% to 0%, of the required DC-voltage. The example ranges are not to be considered as limiting the invention disclosed herein, as these are only examples and other ranges will be within the knowledge of a skilled person.

In accordance with one embodiment of the onboard medium-voltage vessel electric charging apparatus, the onboard medium-voltage vessel electric charging apparatus is configured for scalar or vector control of the series voltage phasor amplitude and phase angle.

According to one embodiment of the onboard medium-voltage vessel electric charging apparatus, the series voltage phasor amplitude and phase angle are continuously controlled.

In accordance with one embodiment of the onboard medium-voltage vessel electric apparatus, the series voltage phasor amplitude and phase angle are continuously controlled over the charging time based on the grid voltage, energy storage device voltage, and charging power set point.

A method for onboard medium-voltage electric charging of at least one onboard energy storage device of a marine vessel from an AC power supply comprises charging the at least one onboard energy storage device directly or via a vessel DC consumer network by a rectifier transformer and rectifier unit arranged in series between the AC power supply and the at least one energy storage device. The method further comprises compensating for voltage variations of the vessel DC consumer network or at least one onboard energy storage device by adding a series voltage phasor with different amplitude and phase angle to supplied AC voltage to adjust rectifier voltage of the rectifier unit.

The method according to one embodiment comprises adding the series voltage phasor amplitude as a symmetric or asymmetric range of required DC-voltage to the vessel DC consumer network or at least one onboard energy storage device.

In accordance with another embodiment, the method comprises using a symmetric range of the series voltage phasor amplitude between −15% to 15%, more preferably between −10% to 10% of the required DC-voltage. The example ranges are not to be considered as limiting the invention disclosed herein, as these are only examples and other ranges will be within the knowledge of a skilled person.

According to one embodiment of the method, the method comprises using an asymmetric range of the series voltage phasor between −30% to 0%, more preferably between −20% to 0%, of the required DC-voltage. The example ranges are not to be considered as limiting the invention disclosed herein, as these are only examples and other ranges will be within the knowledge of a skilled person.

In accordance with a further embodiment, the method comprises controlling the series voltage phasor amplitude and phase angle by scalar control or vector control.

According to another embodiment, the method comprises continuously controlling the series voltage phasor amplitude and phase angle.

According to a further embodiment, the method comprises continuously controlling the series voltage phasor amplitude and phase angle over the charging time based on grid voltage, energy storage device voltage, and charging power set point.

By the onboard medium-voltage electric charging apparatus and method for onboard charging is provided a solution wherein one may use mostly passive components and wherein only the compensation converter will have to be active for performing voltage adjustment.

The onboard medium-voltage charging apparatus and method for onboard charging provides a solution wherein the marine vessel can connect to a standard MVAC (medium-voltage alternating current) grid and independently regulate its charging power based on the available power from the grid.

The disclosed embodiments provide a solution where a wide range of energy storage device voltage variations during charging can be compensated for.

The disclosed embodiments provide a solution where large power flows are regulated in the compensation unit where the current is low.

The disclosed embodiments provide a solution where one may use compact, cheap and efficient diode rectifiers instead of costly active front-end converters.

Accordingly, the disclosed embodiments provide for limiting the volume and footprint of electrical equipment required on the marine vessel.

The disclosed apparatus and method are capable of rectification of the AC power supply and delivery of controlled DC current for charging of the at least one onboard energy storage device.

The disclosed embodiments provide for voltage adjustment over a wider range, compared to prior art solutions.

Accordingly, the disclosed embodiments deal with power regulation using the series compensation, while DC decoupling is done naturally by the galvanically isolating transformers onboard.

The disclosed embodiments target active power control to regulate energy storage device charging power while regulating the reactive power as well to optimize the converter operating point.

The disclosed embodiments provide an electrical configuration and control system onboard the marine vessel that makes the marine vessel independent from specific charging stations. The marine vessel will be able to connect to standard Medium Voltage AC networks regulating its charging power independently.

Further preferable features and advantageous details of the present invention will appear from the following example description, claims and attached drawings.

BRIEF DESCRIPTION OF THE DRAWINGS

The present invention will below be described in further details with references to the attached drawings, where.

DETAILED DESCRIPTION

Figure 1:
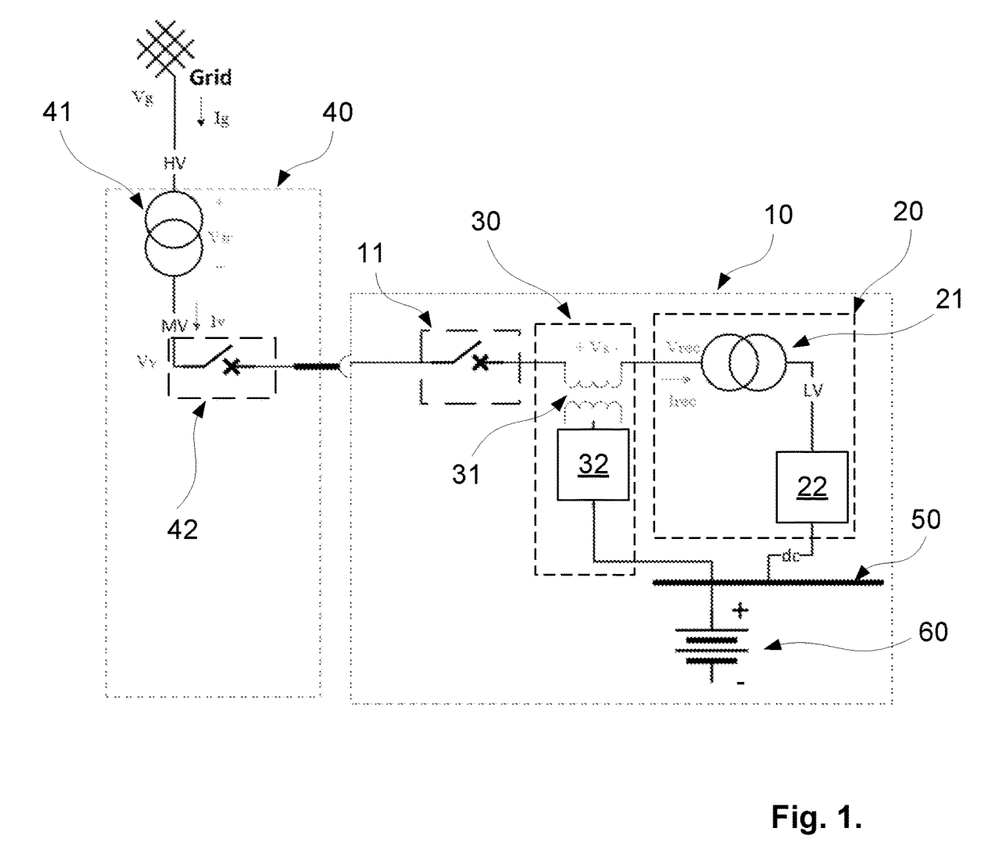
FIG. 1 is a principle drawing of an apparatus according to the disclosure.

In FIG. 1 is shown a principle drawing of an onboard medium-voltage vessel electric charging apparatus 10 (MVVECA) providing AC (alternating current) voltage adjustment over a wide range.

The onboard MVVECA 10 is adapted to be arranged onboard a marine vessel (not shown) and adapted to be connected to an AC power supply 40 at one side and to at least one onboard energy storage device 60 of the marine vessel at the other side, either directly or via a vessel DC (direct current) consumer network 50, as shown in FIG. 1.

The consumer network 50 in the shown example is a DC-distribution system. The AC power supply 40 is e.g. an AC shore power grid. In the shown example the DC-distribution system 50 is arranged to an energy storage device 60 formed by batteries. Intelligent charging electronics, can of course, be arranged between the DC-distribution system 50 and the energy storage device 60.

The onboard MVVECA 10 comprises a rectifier unit 20 arranged between the AC power supply 40 and the at least one energy storage device 60 or vessel DC-consumer network 50. The rectifier unit 20 comprises a rectifier transformer 21, e.g. a DFE (Diode front end), and at least one rectifier bridge 22 arranged in series between the AC power supply 40 and the at least one energy storage device 60 or vessel DC consumer network 50. The rectifier transformer 21 is a MV (Medium Voltage) to LV (Low Voltage) transformer 21 and connected to the AC power supply 40 at one side. The at least one rectifier bridge 22 is preferably a diode rectifier.

The onboard MVVECA 10 further comprises at least one controllable compensation unit 30 arranged in series between the rectifier unit 20 and the AC power supply 40, i.e. in front of the rectifier transformer 21 of the rectifier unit 20. The controllable compensation unit 30 comprises a compensation transformer 31, arranged in series between the AC power supply 40 and the rectifier transformer 21 of the rectifier unit 20. The controllable compensation unit 30 further comprises a controllable compensation converter 32, e.g. an AFE (active front end), arranged in series between the compensation transformer 41 and the rectifier bridge 22, vessel DC consumer network 50 or at least one energy storage device 60. According to one embodiment, the controllable compensation converter 32 is a LV (Low Voltage) converter.

The mentioned controllable compensation unit 30 and rectifier unit 20 thus forms a controllable charging circuit for the at least one energy storage device 60.

According to a further embodiment of the onboard MVVECA 10, it preferably comprises a controllable switch 11 for connection and disconnection of the onboard MVVECA 10 to the AC power supply 40.

An AC grid will typically deliver high voltage, and the AC power supply 40 comprises a HV to MV transformer 41 to transform the high AC voltage to a medium AC voltage suitable for supplying to a marine vessel and thus the onboard MVVECA 10. Accordingly, the AC power supply 40 supplies a voltage $V_v$ and a current $I_v$ to the marine vessel and thus onboard MVVECA 10. It will also be advantageous that a controllable switch 42 is arranged at the output of the AC power supply 40.

The cheapest devices to charge energy storage devices 60 from the AC power supply 40 are diode rectifiers. However, as the energy storage device 60 voltage varies in a wide range during the charging cycle, the diode rectifiers need an adjustable AC voltage varying with $V_{DC}$ to regulate the power.

The series compensation provides an excellent possibility for AC voltage adjustment over a wide range.

By arranging at least one compensation unit 30 in series with the MV part of the AC power supply 40, wherein the current is low, this will enable the possibility to regulate large power flows with at least one controllable low voltage compensation converter 31. Accordingly, the costly active front-ends on LV side of the rectifier unit 20 can be replaced by their compact, cheap, and efficient counterparts, diode bridges 22.

The compensation unit 30 is adapted to add a series voltage phasor $V_s$ with different amplitudes and phase angles to the supplied medium AC voltage $V_v$ of the AC power supply 40 to adjust the rectifier voltage $V_{rec}$ supplied to the rectifier unit 20.

Figure 2:
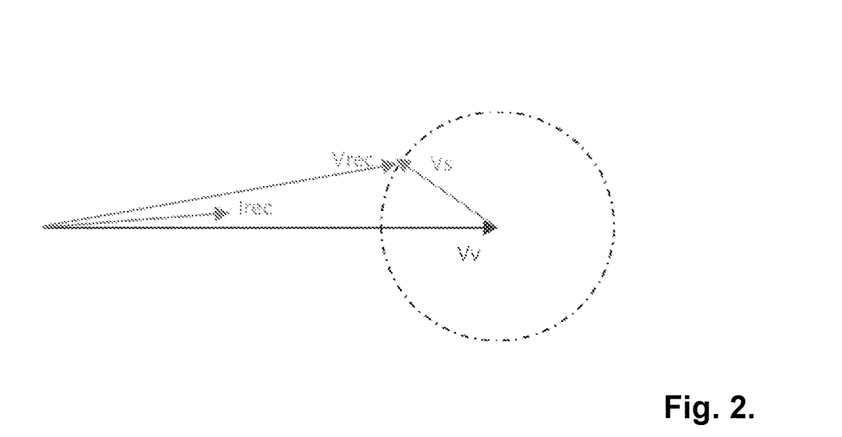
FIG. 2 is an illustration of the control principle of the disclosed embodiments.

Reference is now made to FIG. 2 which is a principle drawing of the control principle. The at least one controllable compensation converter 32 is able to apply any voltage vector within the dashed circle shown in the figure. However, any voltage within this dashed circle is not viable in practice, as it could lead to overcurrent or instability.

By the series compensation unit 30, the voltage of each device could independently vary, while their currents are equal. Accordingly, by the at least one controllable compensation converter 32 regulating its own current, the at least one controllable compensation converter 32 will regulate the currents of other devices/components of the onboard MVVECA 10 and consequently their active and reactive powers (as long as the AC power supply 40 is strong enough to maintain the voltage).

It is common that DC voltage $V_{DC}$ on the DC consumer network 50 or energy storage device 60 varies by around 20% during charging of the at least one energy storage device 60. To counteract this, the at least one controllable compensation converter 32 according to one embodiment is configured to provide a voltage window of around 20% range of the $V_{DC}$ and configured to adapt the AC voltage $V_{rec}$ supplied to the rectifier unit 20 by adding an adapted series voltage phasor $V_s$ to the supplied voltage $V_v$ of the AC power supply 40. As mentioned above, the ranges may vary depending on the application and specifications of the system.

The optimal design/operating conditions of the controllable compensation unit 30 is when the series voltage phasor $V_s$ vector is approximately aligned with the rectifier voltage vector $V_{rec}$ supplied to the rectifier unit 20. When these operating conditions are met, the required series voltage phasor $V_s$ amplitude is at the lowest, while the compensation unit 30 by the least one controllable compensation converter 32 contributes mainly with active power. Both of these conditions provide minimum converter derating.

Figure 3A:
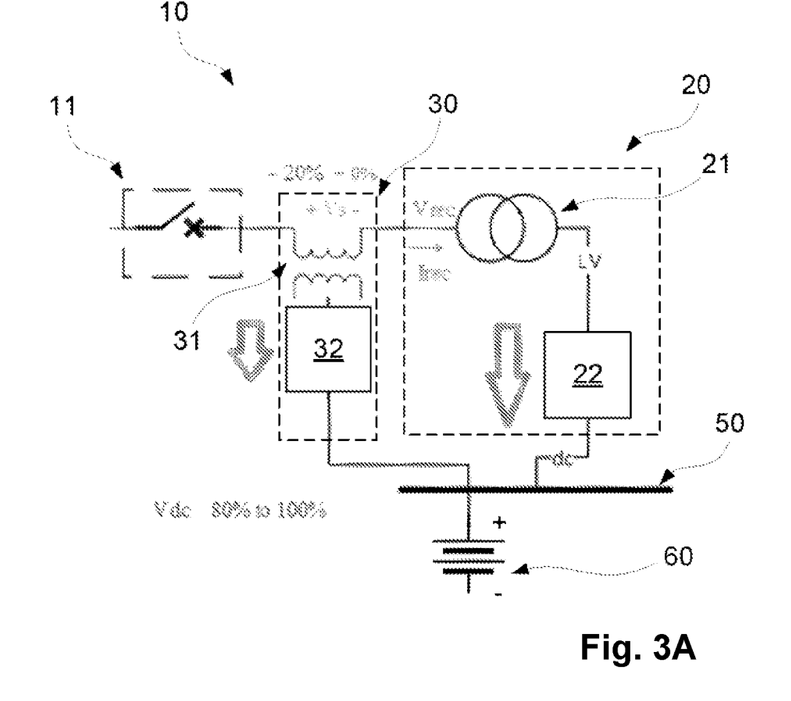
FIGS. 3A and 3B show a principle drawing of an embodiment of the disclosed apparatus and the corresponding control principle, respectively.
Figure 3B:
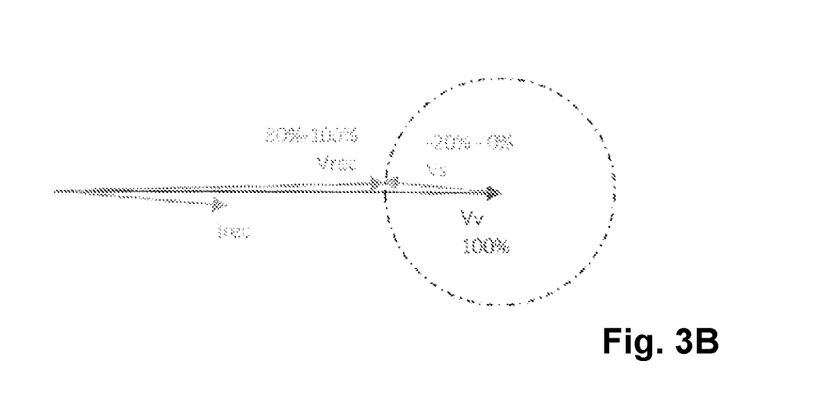
Figure 4A:
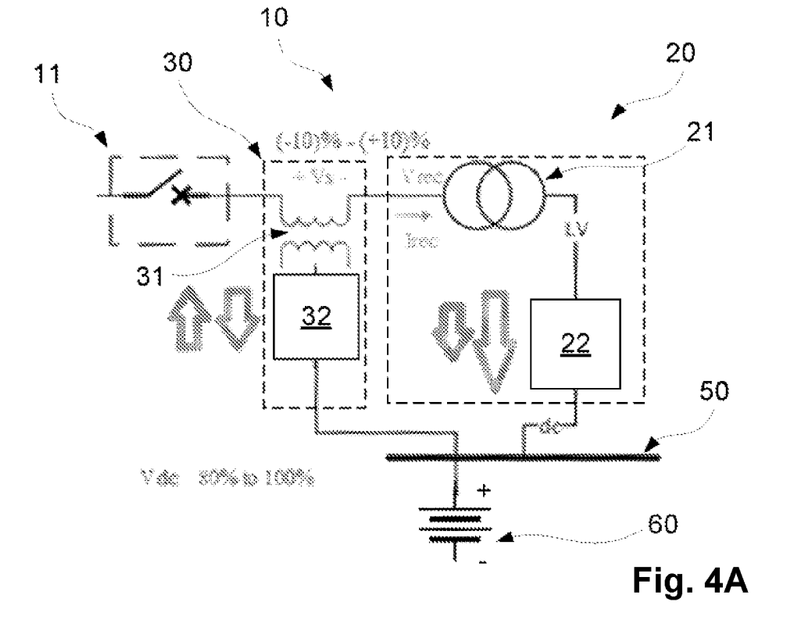
FIGS. 4A and 4B show a principle drawing of a further embodiment of the disclosed apparatus and corresponding control principle, respectively.
Figure 4B:
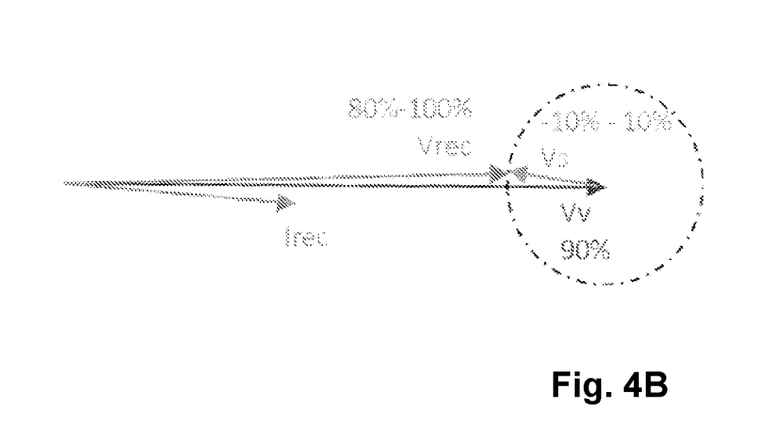

Reference is now made to FIGS. 3A and 3B showing a principle drawing of an embodiment wherein the controllable compensation unit 30 is configured to provide a series voltage phasor $V_s$ amplitude varying from −20% to 0% of the $V_{DC}$, and FIGS. 4A and 4B showing a principle drawing of an embodiment where the controllable compensation unit 40 is configured to provide a series voltage phasor $V_s$ amplitude varying from −10% to 10% of the $V_{DC}$.

The main advantage of the embodiment of FIGS. 3A and 3B over the embodiment of FIGS. 4A and 4B is that in the first embodiment one avoids circulating currents. The embodiment of FIGS. 3A and 3B further have some disadvantages in relation to the embodiment of FIGS. 4A and 4B. The compensation transformer 31 primary voltage (and power) and secondary current will be doubled compared with the embodiment of FIGS. 4A and 4B. Accordingly, in the embodiment of FIGS. 3A and 3B, double AFEs (Active Front End) are needed compared to the embodiment of FIGS. 4A and 4B.

One advantage of the embodiment of FIGS. 4A and 4B over the embodiment of FIGS. 3A and 3B is that the number of AFEs required is reduced. An equivalently rated DFE (Diode front end) needs to be added on DFE side instead, which is less costly than the AFE. The solution of the embodiment of FIGS. 4A and 4B further results in lower losses compared to the solution of the embodiment of FIGS. 3A and 3B. A further advantage with the embodiment of FIGS. 4A and 4B is that the compensation transformer 31 will only be required to be half the size of the compensation transformer 31 of the embodiment in FIGS. 3A and 3B. Accordingly, the embodiment of FIGS. 4A and 4B in addition to the mentioned advantages requires less space than the embodiment of FIGS. 3A and 3B.

A disadvantage of solution of FIGS. 4A and 4B in relation to FIGS. 3A and 3B is that one during half of the charging cycle of the energy storage device 60 will have circulating current. A further disadvantage compared to the embodiment of FIGS. 3A and 3B is slightly larger DFE/rectifier transformer 21.

Figure 5:
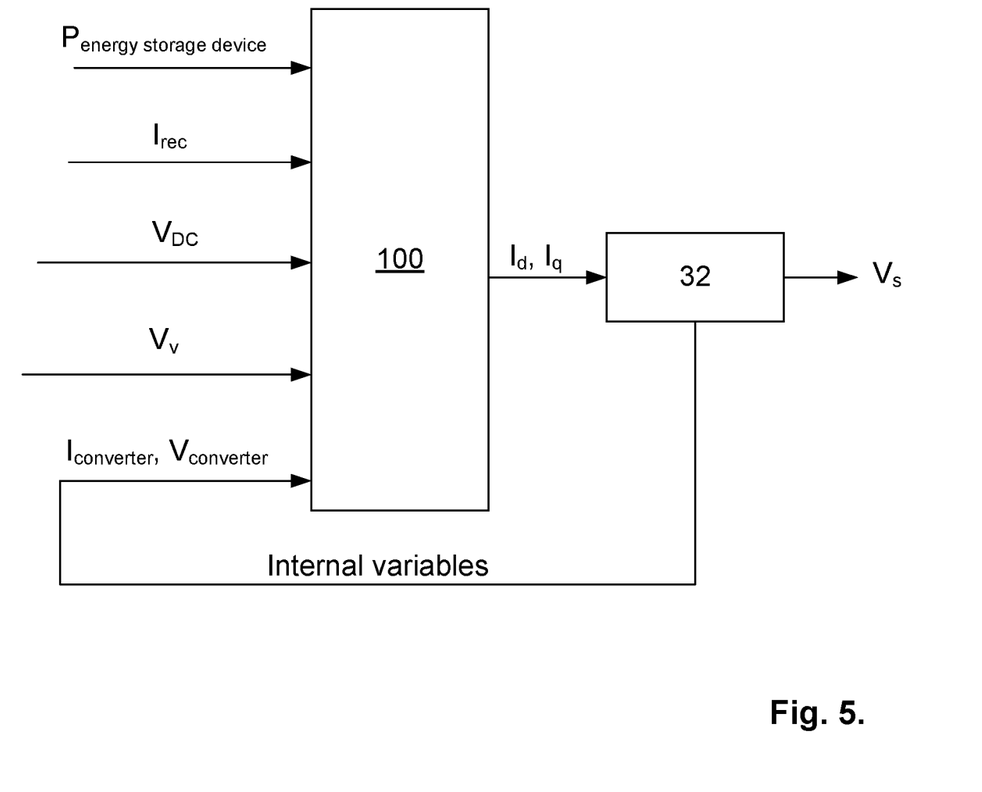
FIG. 5 is a principle drawing of a controlling of the disclosed apparatus.

Reference is now made to FIG. 5 showing a block diagram of controlling of the onboard MVVECA 10. For controlling of the onboard MVVECA 10, the onboard MVVECA 10 comprises a control device 100 provided with means and/or software for controlling the compensation unit 30 by finding/calculating the correct voltage under each condition to maintain all components of the onboard MVVECA 10 within their limits. The onboard MVVECA 10 is further preferably provided with one or more sensors and/or battery management system or other intelligent charging electronics to provide measurements of $V_{DC}$, $V_v$, $I_{rec}$ and $V_{rec}$ as input to the control device 100. In addition, the controllable converter 32 is arranged to provide measures of $I_{converter}$ and $V_{converter}$ as input to the control device 100.

The mentioned control device 100 is provided with means and/or software for scalar control or vector control of the compensation unit 30, as described above. In a safe and simple control mode of the control device 100, the control device 100 is adapted to control/setting the current as the control variable of the at least one controllable compensation converter 32 of the compensation unit 30.

According to one embodiment, the control device 100 is adapted for scalar control by adjusting series voltage phasor $V_s$ amplitude and phase angle to be provided by the controllable compensation unit 30 to regulate active and reactive powers and indirectly regulate the rectifier unit 20 current $I_{rec}$. The slow dynamics of this control method, particularly when the series voltage phasor $V_s$ is close to zero, makes it prone to instability.

Figure 6:
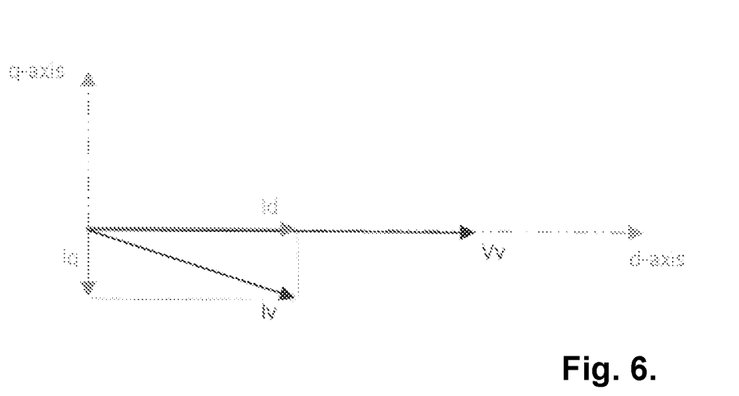
FIG. 6 is a principle drawing of a vector control mode of the disclosed embodiments.

According to one embodiment, the control device 100 is adapted for vector control, as shown in FIG. 6, by control in d-q coordinate, which results in a much faster dynamics, compared to the scalar control method, while it is straightforward for this configuration. The key of the vector control method is to align the d-axis with the supplied AC $V_v$ from the AC power supply 40. Then, the d-axis current will be the active component of the rectifier unit 20 current $I_{rec}$. In vector mode the control device 100 will be adapted to use $I_d$ as control variable to regulate the charging power (active power) of the controllable compensation unit 30 and $I_q$ as control variable to maintain power factor of the inverter bridge of the at least one controllable compensation converter 32 at unity. By the latter one will achieve minimum derating of the at least one controllable compensation converter 32.

Accordingly, current mode control in d-q coordinate is the preferred solution due to its fast dynamics and accuracy.

The control device 100 according to one embodiment is configured to/provided with means and/or software for continuously controlling the series voltage phasor $V_s$ amplitude and phase angle. In a further embodiment, the control device 100 is configured to/provided with means and/or software for continuously controlling the series voltage phasor $V_s$ amplitude and phase angle over the charging time based on grid voltage, energy storage device voltage, and charging power set point.

With the onboard medium-voltage charging method and apparatus, a charging power of up to 10 MW can be regulated by a single 1700 KW rectifier bridge 22 due to the series configuration of the controllable compensation unit 30.

Short circuit voltage (uk %), secondary and primary voltages, and tapping of different transformers (compensation transformer 31 and rectifier transformer 21) are important parameters in an optimized configuration of the onboard MVVECA 10. An example of a cost-effective configuration is when the vessel voltage $V_v$ is set at 0.9 pu, series voltage $V_s$ at 0.1 pu, and transformer 21 and 31 tappings are adjusted to compensate for the voltage drops across uk % of the transformers 21 and 31.

To optimize the cost, it is best to allow small circulating power over the second half of charging time between the rectifier unit 20 and the controllable compensation converter 32. This will reduce the required number of AFEs while reducing the losses as well.

The controllable compensation unit 30 is sensitive to overmodulation and m>1.15 should be avoided even in transient; otherwise the system will become unstable. Therefore, the passive components of the onboard MVVECA 10 should be designed in such a way that m is strictly maintained below 1.15 in all conditions.

The above described rectifier bridge 22 can be formed by one or more sub-rectifiers arranged in series or parallel configuration.

Above described controllable compensation converter 32 can be formed by one or more sub-AFEs arranged in series or parallel configuration.

Even though the examples make use of an AC power supply 40 grid, the inventive embodiments are applicable for marine vessel-to-vessel power transfer.

The features of the above described embodiments can be combined to form other embodiments within the scope of the attached claims.

The invention claimed is:

1. An onboard medium-voltage vessel electric charging apparatus (10), the apparatus (10) being connected to an AC power supply (40) at one side and to at least one onboard energy storage device (60) at the other side, comprising:
a rectifier unit (20) comprising a rectifier transformer (21) and at least one rectifier bridge (22) arranged in series between the AC power supply (40) and the at least one energy storage device (60); and
a controllable compensation unit (30) arranged in series between (i) the rectifier unit (20) or (ii) at least one energy storage device (60) and the AC power supply (40) in front of the rectifier transformer (21), wherein
the controllable compensation unit (30) is configured to compensate for voltage variations of the at least one energy storage device (60) by adding a series voltage phasor ($V_s$) with different amplitude and phase angle to supplied AC voltage ($V_v$) to adjust rectifier voltage ($V_{rec}$) of the rectifier unit (20).

2. The onboard medium-voltage vessel electric charging apparatus (10) according to claim 1, wherein the apparatus (10) is directly connected to the at least one energy storage device (60) or connected to the at least one energy storage device (60) via a vessel DC consumer network (50).

3. The onboard medium-voltage vessel electric charging apparatus (10) according to claim 1, wherein the rectifier transformer (21) is a Medium-Voltage to Low-Voltage AC transformer.

4. The onboard medium-voltage vessel electric charging apparatus (10) according to claim 1, wherein the controllable compensation unit (30) comprises
a compensation transformer (31) arranged in series between the AC power supply (40) and rectifier transformer (21) of the rectifier unit (20), and
at least one controllable compensation converter (32) arranged in series between the at least one rectifier bridge (22) of the rectifier unit (20), vessel DC consumer network (50) or at least one energy storage device (60) and the compensation transformer (31).

5. The onboard medium-voltage vessel electric charging apparatus (10) according to claim 4, wherein the controllable compensation converter (32) is a Low-Voltage converter.

6. The onboard medium-voltage electric charging apparatus (10) according to claim 4, wherein the at least one compensation unit (30) is configured to provide the series voltage phasor ($V_s$) amplitude as a symmetric or asymmetric range of required DC-voltage ($V_{DC}$) to the vessel DC consumer network (50) or at least one energy storage device (60).

7. The onboard medium-voltage vessel electric charging apparatus (10) according to claim 6, wherein the symmetric range of the series voltage phasor ($V_s$) amplitude is between-15% and 15% of the required DC-voltage ($V_{DC}$).

8. The onboard medium-voltage vessel electric charging apparatus according to claim 6, wherein the asymmetric range of the series voltage phasor ($V_s$) amplitude is between-30 and 0% of the required DC-voltage ($V_{DC}$).

9. The onboard medium-voltage vessel electric charging apparatus (10) according to claim 4, wherein the at least one compensation unit (30) is configured for scalar control or vector control of the series voltage phasor ($V_s$) amplitude and phase angle.

10. The onboard medium-voltage vessel electric charging apparatus (10) according to claim 9, wherein the at least one compensation unit (30) is configured for continuously controlling the series voltage phasor ($V_s$) amplitude and phase angle.

11. The onboard medium-voltage vessel electric charging apparatus (10) according to claim 9, wherein the at least one compensation unit (30) is configured for continuously controlling the series voltage phasor ($V_s$) amplitude and phase angle over the charging time based on the grid voltage, energy storage device voltage, and charging power set point.

12. A method for onboard medium-voltage electric charging of at least one onboard energy storage device (60) of a marine vessel from an AC power supply (40), comprising:
charging the at least one energy storage device (60) directly or via a vessel DC consumer network (50) by a rectifier unit (20) comprising a rectifier transformer (21) and at least one rectifier bridge (22) arranged in series between the AC power supply (40) and the at least one energy storage device (60), and
compensating for voltage variations of the vessel DC consumer network (50) or at least one energy storage device (60) by adding a series voltage phasor ($V_s$) with different amplitude and phase angle to supplied AC voltage ($V_v$) to adjust rectifier voltage ($V_{rec}$) of the rectifier unit (20).

13. The method for onboard medium-voltage electric charging according to claim 12, comprising adding the series voltage phasor ($V_s$) amplitude as a symmetric or asymmetric range of required DC-voltage ($V_{DC}$) to the vessel DC consumer network (50) or at least one energy storage device (60).

14. The method for onboard medium-voltage electric charging according to claim 13, comprising using a symmetric range of the series voltage phasor ($V_s$) amplitude between-15% and 15 of the required DC-voltage ($V_{DC}$).

15. The method for onboard medium-voltage electric charging of at least one energy storage device (70) according to claim 14, comprising controlling the series voltage phasor ($V_s$) amplitude and phase angle by scalar control or vector control.

16. The method for onboard medium-voltage electric charging according to claim 15, comprising continuously controlling the series voltage phasor ($V_s$) amplitude and phase angle.

17. The method for onboard medium-voltage electric charging according to claim 16, comprising continuously controlling the series voltage phasor ($V_s$) amplitude and phase angle over the charging time based on grid voltage, energy storage device voltage, and charging power set point.

18. The method for onboard medium-voltage electric charging according to claim 13, comprising using an asymmetric range of the series voltage phasor ($V_s$) amplitude between-30% to 0% of the required DC-voltage ($V_{DC}$).

19. The method for onboard medium-voltage electric charging of at least one energy storage device (70) according to claim 18, comprising controlling the series voltage phasor ($V_s$) amplitude and phase angle by scalar control or vector control.

20. The method for onboard medium-voltage electric charging according to claim 19, comprising continuously controlling the series voltage phasor ($V_s$) amplitude and phase angle.

* * * * *